July 25, 1944. R. P. BLAKE 2,354,243
APPARATUS AND METHOD FOR ORIENTING THE
SURFACE MOLECULES OF PLASTIC MATERIALS
Filed Jan. 26, 1942 3 Sheets-Sheet 1

INVENTOR.
Robert P. Blake
BY Donald C. Bowe
Attorney

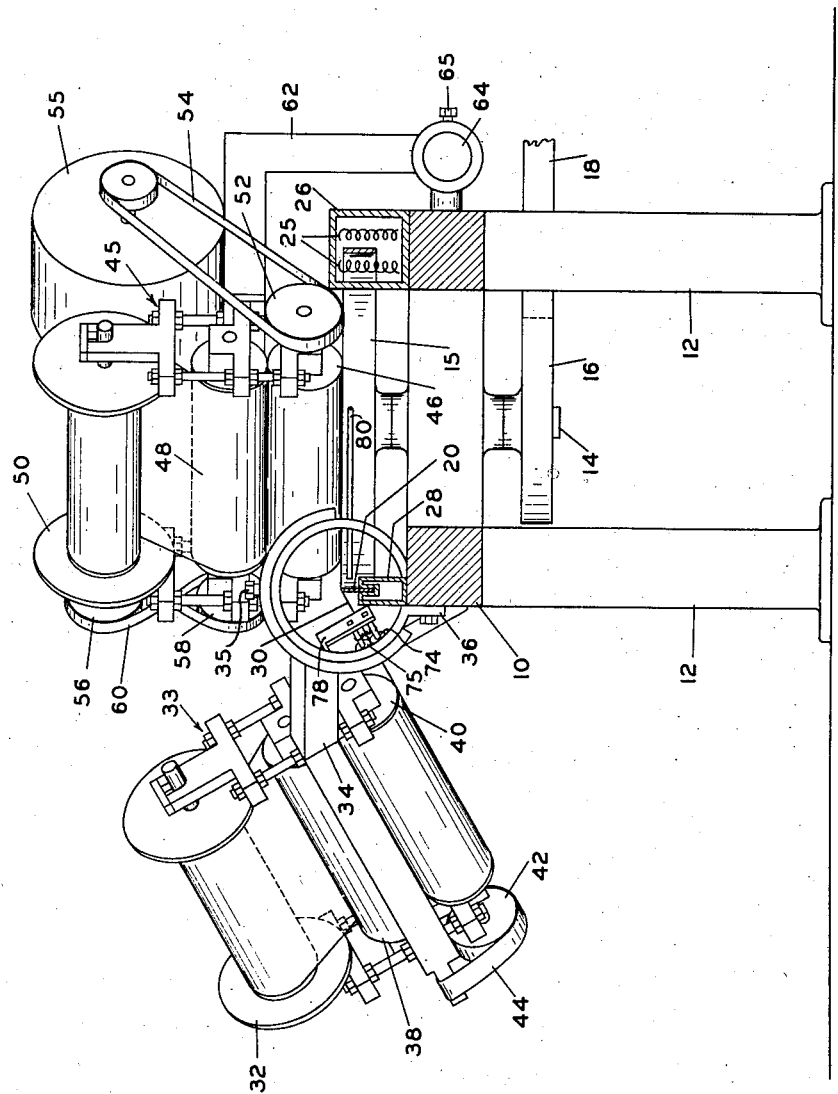

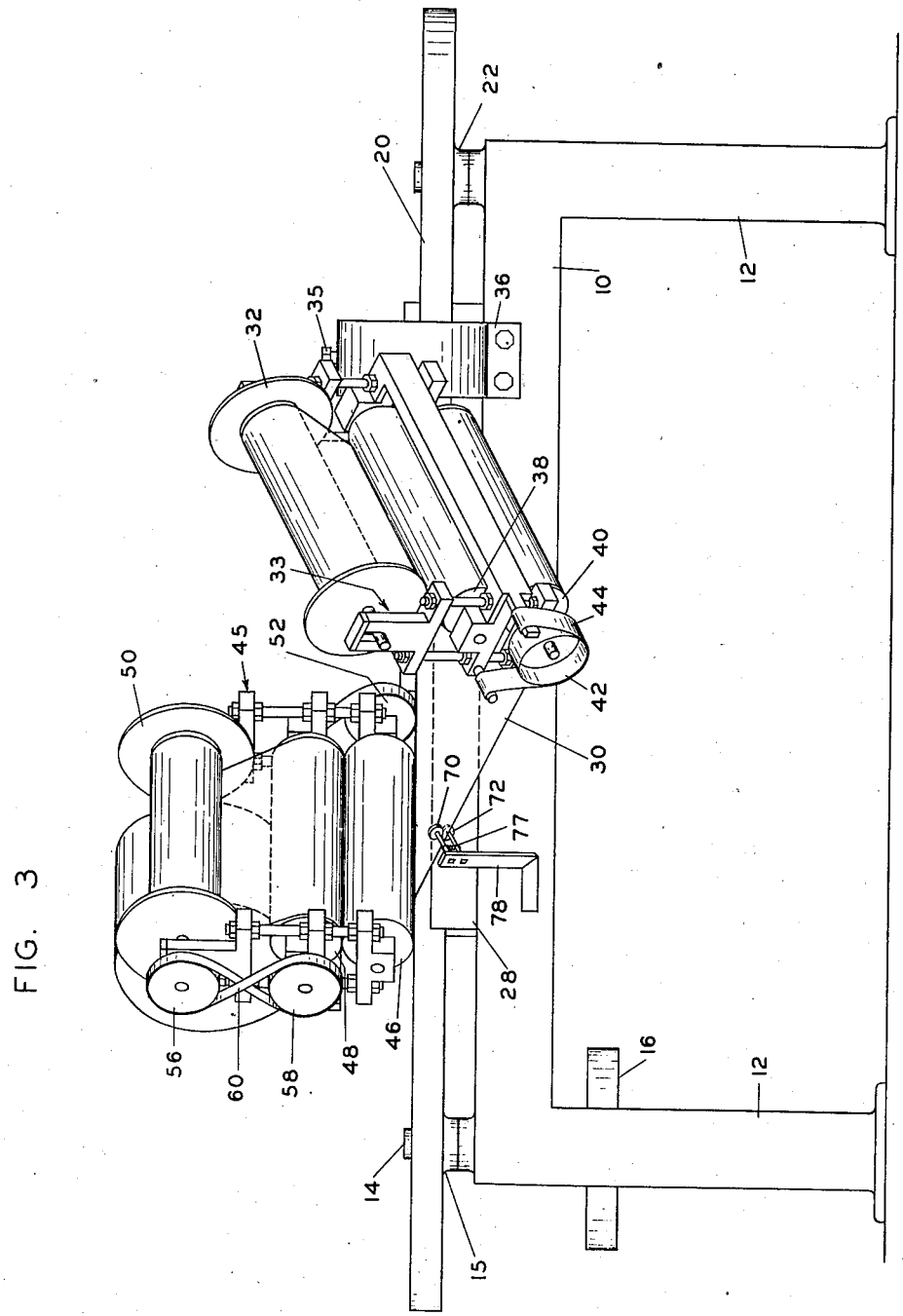

Patented July 25, 1944

2,354,243

UNITED STATES PATENT OFFICE 2,354,243

APPARATUS AND METHOD FOR ORIENTING THE SURFACE MOLECULES OF PLASTIC MATERIALS

Robert P. Blake, Cambridge, Mass., assignor to Polaroid Corporation, Dover, Del., a corporation of Delaware Application January 26, 1942, Serial No. 428,336

21 Claims. (Cl. 18—1)

This invention relates to apparatus and methods for orienting the molecules of plastic materials, and more particularly to apparatus and methods for orienting the surface molecules of sheet plastic materials.

There have heretofore been developed various types of light-polarizing materials each comprising a sheet of a transparent plastic material the molecules of which have been oriented to substantial parallelism. In these polarizing materials a sheet of the character described has been converted into a light-polarizing element by dyeing, staining or otherwise treating the sheet with a dichroic dye or stain, for example with a dichroic direct cotton dye or with a stain comprising iodine or with a stain comprising a metal such, for example, as mercury. Speaking generally, preferred plastic materials for use in the production of such light-polarizing materials have been found to comprise the class of plastics which may be defined as the linear, high polymeric, plastic materials the molecules of which contain hydroxyl groups. Suitable materials for use in the manufacture of light polarizers of the character described and falling within the class of materials as defined are regenerated cellulose or "Cellophane," polyvinyl acetal and polyvinyl alcohol and, of these materials, the preferred material is polyvinyl alcohol.

In the polarizers of the type described, the sheet of plastic material entering into the polarizing body is prepared by first heating or softening, and then by stretching until substantial orientation of its molecules has been obtained. In the case of polyvinyl alcohol, adequate orientation of the molecular structure of the sheet has been obtained if the sheet is extended to from twice to five times its initial length, although under certain circumstances it has been found desirable to increase the orientation by extension of the sheet to as much as eight times its initial length.

Instead of stretching a plastic sheet and thus orienting the molecules throughout its thickness, improved results are obtained if the molecular orientation be sufficient only to penetrate a layer on the surface of the plastic sheet, with the molecules throughout the remainder of the sheet remaining heterogeneously oriented. It is possible to orient the molecules on both surfaces of a sheet of material such as polyvinyl alcohol in directions substantially at right angles to each other, with the oriented portions separated by an inner portion of the sheet wherein the molecules remain heterogeneously oriented. Such a product is, for example, admirably suited for use in the production of superimposed, dichroic, stereoscopic images.

It is accordingly an object of the present invention to provide apparatus for bringing about the above described surface molecular orientation of sheet plastic materials.

Another object of the invention is to provide a method of producing the above described surface orientation wherein the plastic sheet is caused to pass over a relatively rapidly moving friction element such, for example, as a continuous, flexible belt.

A further object is to provide apparatus for carrying out the above method, comprising a rapidly moving, continuous belt and means for causing the sheet material to be oriented to pass over an edge of said belt while in frictional contact therewith.

A still further object is to provide apparatus for producing the above described surface molecular orientation wherein the direction of said molecular orientation may be controlled or varied with respect to the angular relation between it and an edge of said sheet.

Further objects and advantages will in part appear and in part be pointed out in the course of the following description of an embodiment of the invention, which is given as a non-limiting example, in connection with the accompanying drawings, in which:

Fig. 2 is a sectional view taken on the line 2—2 in Fig. 1; and

Fig. 3 is a front elevation looking in a direction at approximately right angles to the direction of the view in Fig. 2.

Figure 1:
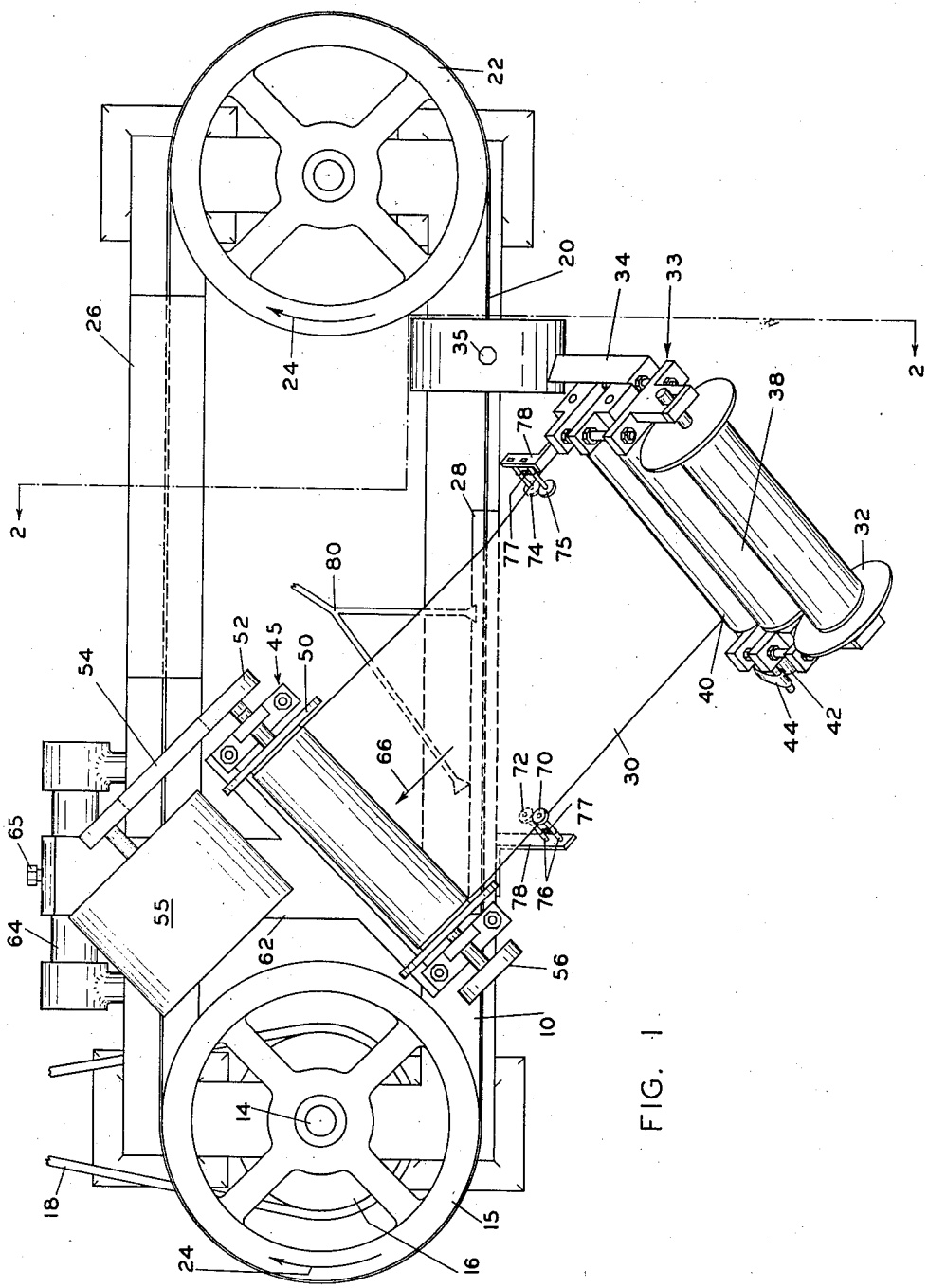
Figure 1 is a plan view of apparatus embodying one form of the invention.

In the drawings, 10 represents a frame, preferably of metal, provided with suitable legs 12. Journaled in one end of frame 10 is a shaft 14 carrying at its upper end a pulley 15 and at its lower end a pulley 16 driven through a belt 18 by any suitable motor means, not shown. At the opposite end of frame 10 is an idler pulley 22, and between pulleys 15 and 22 runs a continuous belt 20. In the arrangement shown in the drawings, the direction of motion of belt 20 is indicated by arrows 24.

In the preferred embodiment of the invention, belt 20 is made of relatively hard, non-heat-conducting material such, for example, as fiber or plastic. Alternatively, belt 20 may be of heat-conducting material such as steel or other metal, but in this case means are preferably provided for applying local heat to said belt, for reasons which will be pointed out hereinafter. Such local heat-applying means are indicated in Fig. 2 as comprising electric coils 25 mounted in a suitable housing 26. It will be apparent that belt 20 may be mounted and driven in many ways other than that shown in the drawings, but said belt should preferably run straight over at least a portion of its course. There are also preferably provided means for supporting said straight belt portion, suitable supporting means for example being indicated as comprising a channel member 28, which will preferably be made hollow, as shown, in order to permit cooling thereof in operation, as by means of the circulation of water.

According to the method of the invention, belt 20 is caused to move relatively rapidly, and the sheet material whose surface molecules it is desired to orient is caused to pass over the moving edge of the straight portion of said belt with a predetermined speed and at a predetermined angle to the direction of motion of said straight belt portion. Said speeds and angle may be varied within considerably wide ranges, depending upon the direction and extent of molecular orientation desired, as will be pointed out in more detail hereinafter.

In the drawings, 30 represents the material to be oriented, and it will be noted that it is shown as comprising a relatively long film which, in the embodiment shown in the drawings, is assumed initially to be wound upon rotatably mounted spool 32. As is shown more clearly in Figs. 1 and 2, spool 32 rides in frame 33, which is mounted for partial rotation, as by means of arm 34 and set screw 35, on round bracket 36 bolted or otherwise secured to frame 10. Similarly pivoted in frame 33 is a pair of rollers 38 and 40 of rubber or similar material. Roller 40 may conveniently be provided with means for controlling its rotation such, for example, as pulley 42 working against drag brake 44.

On the opposite side of the straight belt portion from the above described pulley and spool assembly is a similar assembly comprising a frame 45 carrying a pair of pivoted rubber rollers 46 and 48 and a spool 50 adapted to receive the sheet material initially carried by spool 32. There are also provided means for driving this roller and spool assembly, such, for example, as pulley 52 carried by roller 46 and driven by motor 55 through belt 54. Similarly, spool 50 may be rotated by means of pulleys 56 and 58 and belt 60. This whole assembly may conveniently be adjustably mounted on frame 10 by means of arm 62, slidably and rotatably mounted upon bracket 64 and controlled by set screw 65.

The operation of the above described apparatus is substantially as follows. Spool 32 carrying a roll of sheet material such as polyvinyl alcohol is mounted in frame 33, and said material is passed between rollers 38 and 40, and then drawn over and passed between rollers 46 and 48 and secured to spool 50. This operation may be accomplished most conveniently with frame 33 in an upright position, that is, with rollers 38 and 40 substantially horizontal. Frame 45 and/or frame 33 may then be rotated on brackets 64 and 36 respectively until the desired angle is obtained between the two planes in which the straight portions of material 30 lie. For preferred results, said angle may vary between 50 degrees and 150 degrees. For example, satisfactory results may be obtained with rollers 38 and 40 in the position shown in the drawings, namely at an angle of approximately 45 degrees to the horizontal, that is to say, to the plane of the edge of belt 20, and with rollers 46 and 48 approximately horizontal or in the plane of the edge of belt 20.

In this connection an important requirement should be noted if best results are to be obtained. This requirement is that the two sets of rollers should be so positioned with respect to each other and to belt 20 that the distance between the point at which material 30 is tangent to roller 40 and the point at which said material is tangent to roller 46 should be the same along both edges of said material. In other words, the sum of a normal from the axis of rotation of roller 40 to any point on the upper edge of belt 20 crossed by material 30 added to a normal to the same point from the axis of rotation of roller 46 should be substantially constant. It will be seen that this requirement is desirable in order to prevent uneven pull on material 30 and hence uneven orientation of its surface molecules.

When the two pairs of rollers have been threaded and set in their proper relative positions, belt 20 is caused to move at relatively high speed and motor 50 is operated to drive roller 46 and hence to draw material 30 over the moving belt in the direction indicated by arrow 66 in Fig. 1. The relative speeds of motion of belt 20 and material 30 may be varied to a wide degree depending in part upon the angle of roller 40 with respect to belt 20 and to the direction of orientation desired. A preferred orientation, for example, is in a direction substantially at 45 degrees to the edges of material 30. Such a direction of orientation may be obtained, for example, by setting frame 45 so that material 30 is drawn across belt 20 in a direction at an angle of approximately 46 degrees to the direction of motion of the belt at a speed of approximately 35 feet a minute. With this arrangement roller 40 may conveniently be at an angle of approximately 46 degrees to the plane of the edge of belt 20, and said belt may be driven at a speed of approximately 1700 feet a minute. It will be understood, however, that these specific figures are given only as an illustrative example and are in no way to be construed as limiting the scope of the invention.

During the orienting operation, rollers 38 and 40, and 46 and 48, respectively, are preferably set so that they grip material 30 relatively firmly, and at the same time relatively even pressure between said material and belt 20 is maintained by the action of drag brake 44 on roller 40. Alternatively, substantially the same result may be obtained by providing separate, direct drive means for roller 40, geared to drive it at a slightly lower speed than roller 46. This arrangement, moreover, may be varied within a wide range without changing the essential operation of the apparatus, and it will be understood that any and all such variations are to be construed as falling within the scope of the invention and of the claims herein.

It has been found that preferred results are obtained if there is also provided means for exerting lateral tension on sheet 30 just before it crosses belt 20. As shown, such means may comprise pairs of idler rollers 70, 72, and 74, 75 positioned on opposite sides of sheet 30. Said rollers may be freely rotatable on arms 76 pivotally mounted on brackets 78, which may in turn be suitably mounted on frame 10. Spring 77 connects each pair of arms 76 and thus causes each pair of rollers 70, 72, and 74, 75 to grip sheet

30. Said rollers may be mounted obliquely with respect to the edges of sheet 30 to apply relatively slight lateral tension thereto, which tension need only be sufficient to eliminate longitudinal wrinkles caused by the longitudinal tension thereon.

It appears that during the above described operation, the frictional contact between the rapidly moving belt and the plastic material generates local heat at their point of contact sufficient to soften the surface material of the sheet. The filaments or particles in said softened layer then appear to adhere temporarily to the belt and to be stretched in its direction of motion to approximately their elastic limit before being pressed down again into the surface of the sheet. This tensioning of the surface filaments is analogous to the stretching of the entire sheet referred to above, and it accordingly produces an orientation of the molecules in said surface layer similar to the orientation obtained by stretching of the entire sheet.

As was pointed out above, belt 20 may be made of fiber or other non-heat-conducting material, and in such case it will ordinarily generate sufficient frictional heat to produce adequate orientation. It may be desirable, however, to heat said belt initially in order to bring it up to the working temperature. If belt 20 is made of steel or other heat-conducting material, it is desirable that additional heating means be provided such as coils 25, and said belt may be heated to, for example, a temperature of 300 to 400 degrees F. and maintained at that temperature throughout the orienting operation.

It may be found desirable under some conditions to provide additional means for cooling material 30 after it has crossed belt 20 in order to prevent undue softening. Satisfactory cooling means are indicated at 80 as comprising one or more nozzles for applying compressed air over material 30. It will be understood, however, that said air nozzles are shown merely as illustrative of suitable means of accomplishing this result.

Since certain changes in carrying out the above method and in the constructions set forth which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. Apparatus comprising, in combination, an endless belt of flexible material provided with a relatively smooth edge, means for moving said belt at a predetermined speed, said belt running straight over at least a portion of its course, means for bringing a surface of a sheet of a plastic material into contact with the smooth edge of a straight portion of said belt, and means for moving said material at a predetermined angle to the direction of motion of said straight portion of said belt from one side of the latter to the other while maintaining said surface in continuous contact with said smooth edge.

2. Apparatus comprising, in combination, an endless belt of flexible material provided with a relatively smooth edge, means for moving said belt at a predetermined speed, said belt running straight over at least a portion of its course, means for bringing a surface of a sheet of a plastic material into contact with the smooth edge of a straight portion of said belt, means for moving said material at a predetermined angle to the direction of motion of said straight portion of said belt from one side of the latter to the other while maintaining said surface in continuous contact with said smooth edge, and means for varying said angle.

3. Apparatus comprising, in combination, an endless belt of flexible material provided with a relatively smooth edge, means for moving said belt at a predetermined speed, said belt running straight over at least a portion of its course, means for supporting said straight portion of said belt, means for bringing a surface of a sheet of a plastic material into contact with the smooth edge of said supported straight portion of said belt with relatively even force, and means for moving said material at a predetermined angle to the direction of motion of said straight portion of said belt from one side of the latter to the other while maintaining said surface in continuous contact with said smooth edge.

4. Apparatus comprising, in combination, an endless belt of relatively hard, flexible material provided with a relatively sharp, smooth edge, means for moving said belt at a predetermined speed, said belt running straight over at least a portion of its course, means for bringing a surface of a sheet of a plastic material into contact with the smooth edge of a straight portion of said belt with a predetermined force, and means for moving said material at a predetermined angle to the direction of motion of said straight portion of said belt from one side of the latter to the other while maintaining said surface in continuous contact with said smooth edge.

5. Apparatus comprising, in combination, an endless belt of non-heat-conducting, flexible material provided with a relatively smooth edge, means for moving said belt at a predetermined speed, said belt running straight over at least a portion of its course, means for bringing a surface of a sheet of a plastic material into contact with the smooth edge of a straight portion of said belt with a predetermined force, and means for moving said material at a predetermined angle to the direction of motion of said straight portion of said belt from one side of the latter to the other while maintaining said surface in continuous contact with said smooth edge.

6. Apparatus comprising, in combination, an endless belt of heat-conducting, flexible material provided with a relatively smooth edge, means for heating said belt, means for moving said belt at a predetermined speed, said belt running straight over at least a portion of its course, means for bringing a surface of a sheet of a plastic material into contact with the smooth edge of a straight portion of said belt with a predetermined force, and means for moving said material at a predetermined angle to the direction of motion of said straight portion of said belt from one side of the latter to the other while maintaining said surface in continuous contact with said smooth edge.

7. Apparatus comprising, in combination, an endless belt of flexible material provided with a relatively smooth edge, means for moving said belt at a predetermined speed, said belt running straight over at least a portion of its course, means for bringing a surface of a sheet of a plastic material into contact with the smooth edge of a straight portion of said belt, and means for moving said material at a predetermined angle to the direction of motion of said straight portion of said belt from one side of the latter to the other while maintaining said surface in continuous contact with said smooth edge, said last named means comprising a plurality of roller means positioned on opposite sides of said straight belt portion and means for rotating said roller means.

8. Apparatus comprising, in combination, an endless belt of flexible material provided with a relatively smooth edge, means for moving said belt at a predetermined speed, said belt running straight over at least a portion of its course, means for supporting said straight portion of said belt, means for bringing a surface of a sheet of a plastic material into contact with the smooth edge of the supported straight portion of said belt with a predetermined force and for moving said material at a predetermined angle to the direction of motion of said straight belt portion from one side of the latter to the other while maintaining said surface in continuous contact with said smooth edge, said last named means comprising a plurality of roller means positioned on opposite sides of said straight belt portion, means for varying the angular relation between said roller means, and means for rotating said roller means at a predetermined speed.

9. Apparatus comprising, in combination, an endless belt of heat-conducting, flexible material provided with a relatively smooth edge, means for heating said belt, means for moving said belt at a predetermined speed, said belt running straight over at least a portion of its course, means for bringing a surface of a sheet of a plastic material into contact with the smooth edge of a straight portion of said belt with a predetermined force, means for moving said material at a predetermined angle to the direction of motion of said straight portion of said belt from one side of the latter to the other while maintaining said surface in continuous contact with said smooth edge, and means for simultaneously exerting lateral tension on said material before it crosses said belt.

10. Apparatus comprising, in combination, an endless belt of heat-conducting, flexible material provided with a relatively smooth edge, means for heating said belt, means for moving said belt at a predetermined speed, said belt running straight over at least a portion of its course, means for bringing a surface of a sheet of a plastic material into contact with the smooth edge of a straight portion of said belt with a predetermined force, means for moving said material at a predetermined angle to the direction of motion of said straight portion of said belt from one side of the latter to the other while maintaining said surface in continuous contact with said smooth edge, and means for simultaneously exerting tension on said sheet in a direction substantially parallel to said straight portion of said belt, said last named means being positioned to operate on said material before it crosses said belt.

11. Apparatus for orienting the surface molecules of sheet plastic materials comprising, in combination, a frame, means for mounting in said frame an endless belt of flexible material, means for rotating said belt at a predetermined speed, said belt running straight over at least a portion of its course, means for mounting in said frame a spool carrying material to be oriented, means for mounting in said frame a second spool adapted to receive said material from said first spool, and means for rotating said spools, said spools being so positioned that the surface of material passing from one spool to the other is brought into contact with an edge of said straight portion of said belt with a predetermined force and crosses said straight belt portion at a predetermined angle to the direction of motion thereof.

12. Apparatus for orienting the surface molecules of sheet plastic materials comprising, in combination, a frame, means for mounting in said frame an endless belt of flexible material provided with a relatively smooth edge, means for rotating said belt at a predetermined speed, said belt running straight over at least a portion of its course, means for bringing a surface of a sheet of plastic material into contact with the smooth edge of said straight portion of said belt with a predetermined force and for moving said material at a predetermined angle to the direction of motion of said straight belt portion from one side of the latter to the other while maintaining said surface in continuous contact with said smooth edge, said last named means comprising, in combination, a pair of pivoted rollers positioned in said frame at a predetermined angle to said straight belt portion, a second pair of pivoted rollers positioned in said frame at a predetermined angle to said first named pair of rollers and to said straight belt portion, said pairs of rollers being on opposite sides of said straight belt portion, means for varying the angular relation between said pairs of rollers, and means for rotating said rollers at relatively different predetermined speeds.

13. Apparatus comprising, in combination, an endless belt of flexible material provided with a relatively smooth edge, means for moving said belt at a predetermined speed, said belt running straight over at least a portion of its course, means for bringing a surface of a sheet of a plastic material into contact with the smooth edge of a straight portion of said belt, means for moving said material at a predetermined angle to the direction of motion of said straight portion of said belt from one side of the latter to the other while maintaining said surface in continuous contact with said smooth edge, and means for cooling said material after it passes said belt.

14. Apparatus comprising, in combination, an endless belt of flexible material provided with a relatively smooth edge, means for moving said belt at a predetermined speed, said belt running straight over at least a portion of its course, means for supporting said straight portion of said belt, means for cooling said supporting means, means for bringing a surface of a sheet of a plastic material into contact with the smooth edge of said supported straight portion of said belt with relatively even force, and means for moving said material at a predetermined angle to the direction of motion of said straight portion of said belt from one side of the latter to the other while maintaining said surface in continuous contact with said smooth edge.

15. Apparatus for orienting the surface molecules of sheet plastic materials comprising, in combination, a frame, means for mounting in said frame an endless belt of flexible material provided with a relatively smooth edge, means for rotating said belt at a predetermined speed,